July 6, 1954
T. O. MATHUES
2,682,685
TRANSFER MOLD FOR USE IN THE MANUFACTURE
OF SPONGY RUBBER-LIKE ARTICLES
Filed April 2, 1949
2 Sheets-Sheet 1
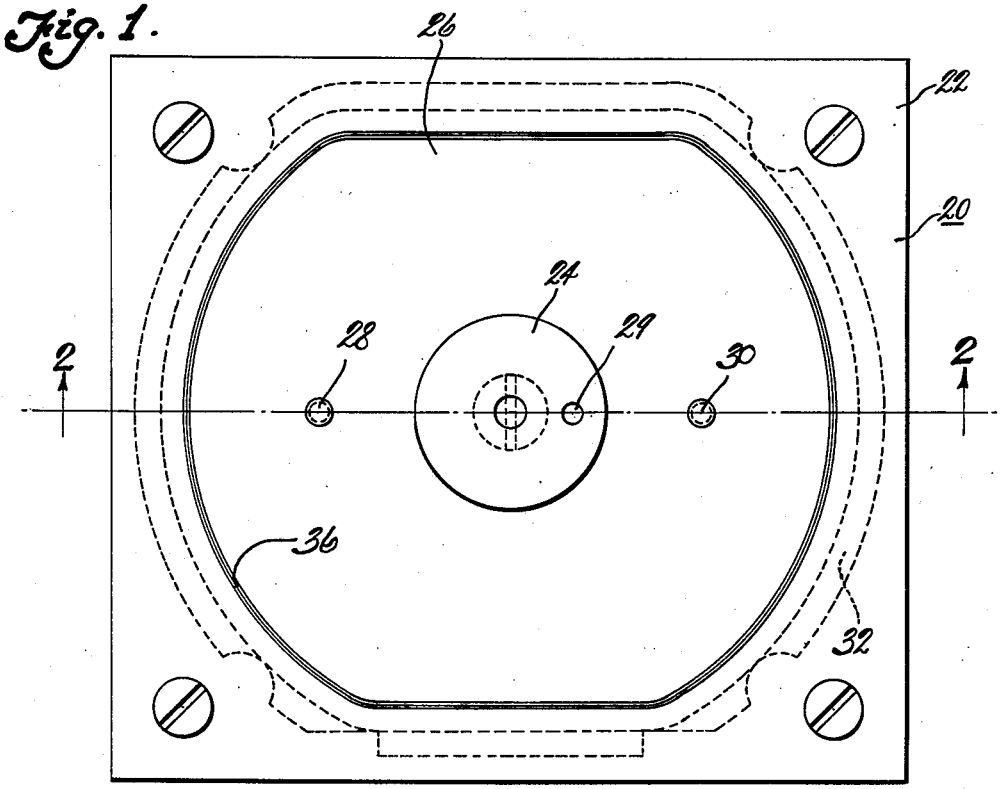
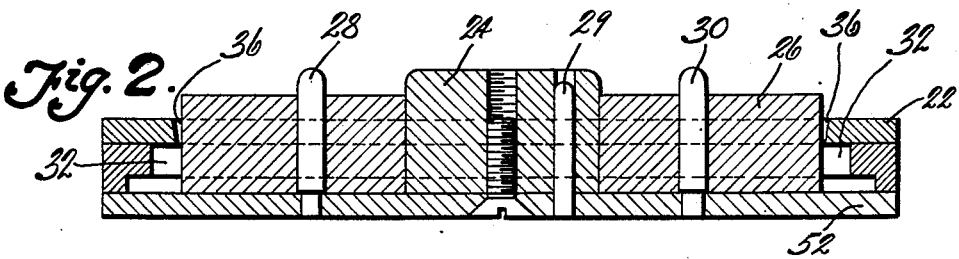
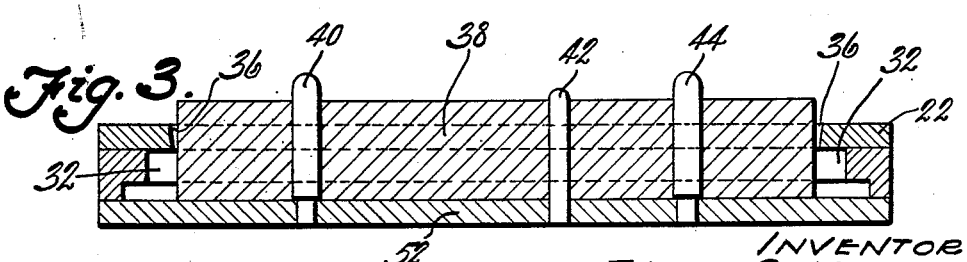
INVENTOR
THOMAS O. MATHUES
BY *[signature]*
*his* ATTORNEYS July 6, 1954  T. O. MATHUES  2,682,685
TRANSFER MOLD FOR USE IN THE MANUFACTURE
OF SPONGY RUBBER-LIKE ARTICLES
Filed April 2, 1949  2 Sheets-Sheet 2
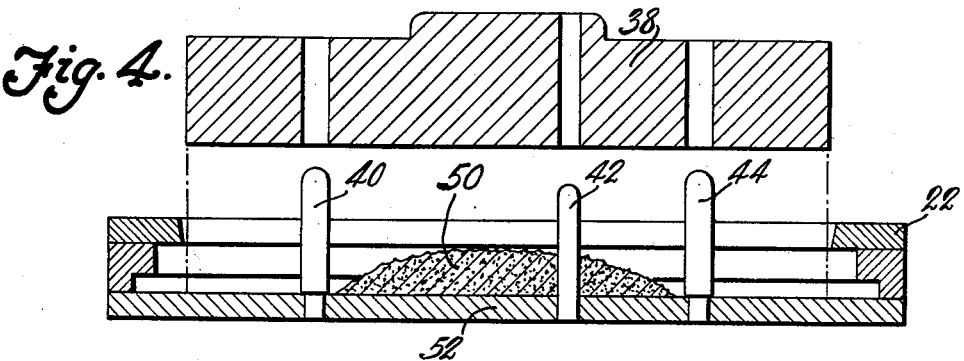
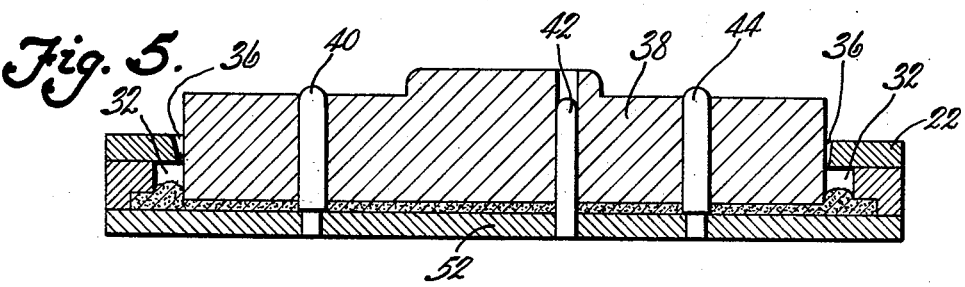
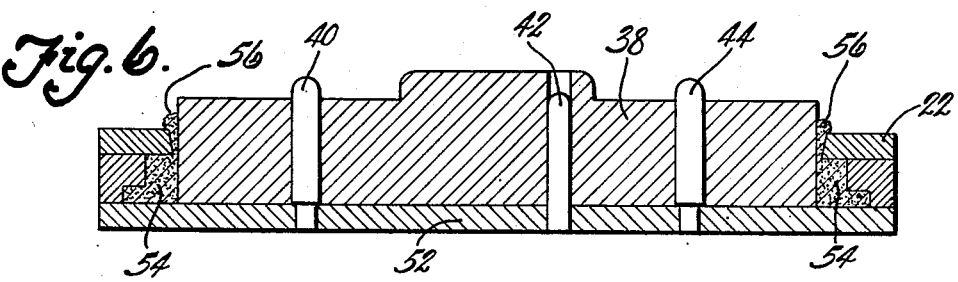
INVENTOR
THOMAS O. MATHUES
BY
HIS ATTORNEYS Patented July 6, 1954

2,682,685

UNITED STATES PATENT OFFICE 2,682,685

TRANSFER MOLD FOR USE IN THE MANUFACTURE OF SPONGY RUBBERLIKE ARTICLES

Thomas O. Mathues, Dayton, Ohio, assignor to General Motors Corporation, Detroit, Mich., a corporation of Delaware Application April 2, 1949, Serial No. 85,149

3 Claims. (Cl. 18—42)

This invention relates to molding and is particularly concerned with the molding of foamed latices.

It is therefore a prime object of this invention to provide a mold for molding foamed latex wherein molded articles may be formed by transfer processes.

In carrying out this object, it is a further object to provide for the transfer of a predetermined quantity of foamed latex from one portion of a mold into a mold cavity whereby an article of the desired shape of sponge rubberlike material is formed after curing.

A still further object of the invention is to provide a mold wherein the mold has a charging portion in which foamed latex may be supplied in predetermined quantities, a piston, or transferring portion, which may be forced into the charging portion whereby the foamed latex is forced or transferred from the charging portion into a cavity after which the material may be cured in the cavity to form a sponge rubber-like article of any specific shape and of the desired cross-section.

A still further object of the invention is to provide a mold wherein cavities having difficult-to-fill cross-sections may be satisfactorily filled with foamed latex through a transfer operation, after which the latex may be cured within the cavity to form a sponge rubber-like article.

Further objects and advantages of the present invention will be apparent from the following description, reference being had to the accompanying drawings, wherein preferred embodiments of the present invention are clearly shown.

In the drawings:

Fig. 1 is a plan view of the mold used in the manufacture of an annular gasket, such as a sponge rubber-like gasket used in connection with a loud speaker.

Fig. 2 is a section, taken on the line 2—2 of Fig. 1, showing the cavity and piston or plunger member.

Fig. 3 is a modification of the mold design shown in Fig. 1, wherein the central portion of the mold has been eliminated and included in the piston part thereof.

Figs. 4 through 6 are views of the mold shown in Fig. 3 at various points in the method of filling the mold, wherein Fig. 4 shows the mold in open position with the charge of foamed latex therein.

Fig. 5 shows the mold with the transferring piston partially forced into place wherein the foamed latex is partially filling the cavity and Fig. 6 is a view of the mold with the piston completely bottomed and the cavity filled, together with a small flash of material therearound to insure complete filling and uniform moderate pressure on the foam.

Molding of foamed latices has been, for the most part, confined to large surfaced simple cross-section parts, such as seat cushions and the like, wherein the foamed latex may be manually manipulated, prior to gelation, into the corners of the mold to insure completely filled molds and wherein the excess foamed latex may be scraped off the top of the mold. The use of foamed latex in the molding of articles having more or less complicated cross-sections, annular shapes and the like, has never been satisfactory, due to difficulty in filling the mold cavity. It is apparent that foamed latex cannot be placed under any great pressure or the air bubbles occluded therein will be disturbed and the final article will not be of a satisfactory spongy nature. Therefore, complicated cross-section articles heretofore have been impossible to make from foamed latex.

In order to manufacture such articles of sponge rubber-like material, it has been necessary to utilize chemically blown sponge rubber wherein the compound may be forced into the mold cavity and held in place after which the sponge is formed due to blowing agents within the compound during the cure.

My invention is directed to the formation of sponge rubber articles of complicated cross-sections, annular shapes, etc., from foamed latex wherein a special method is utilized which does not impair the frothy character of the latex compound and wherein the mold cavity may be adequately filled without manual manipulation and wherein the foamed latex may be cured within the cavity to form a satifactory sponge rubber-like article.

It is a known fact that foamed latices form generally softer and more satisfactory sponges than do chemically blown compounds and for that reason, it is very desirable to utilize foamed latices in such molding procedures.

It is to be understood that the type of foamed latex used in this process and mold, is of no great importance since any properly foamed latex will operate satisfactorily. In this connection, compounded foams of the latices of natural rubber, butadiene-styrene copolymers, butadiene-acrylonitrile copolymers, polychloroprene, mixtures of any of the foregoing and in fact, any natural or synthetic rubber-like material or mixture thereof may be used, the only limitation being that the foam is of a rather stable character and will gel upon standing in the mold and will cure to a satisfactory sponge. Thus it is expressly pointed out that the invention is specifically directed to operations on foamed compounded latex regardless of what type of latex is used. Specific compounding formulas and the like are of no importance here since the prior art is replete with patents disclosing compounds which may be used satisfactorily in this apparatus and method.

Referring specifically to Fig. 1, the mold 20 includes a main body portion 22, a central plug 24, a transfer or piston portion 26 which is guided on the plug 24 and on pins 28, 29 and 30. The body portion 22 has formed therein a cavity 32. In this case, the cavity has a stepped cross-section as shown in Fig. 2 and is annular in shape. Between the piston 26 and the top part of the body portion 22, there is provided a vent or relief 36 between the piston and the body portion, which vent 36 connects with the cavity 32. It will be noted that the cross-section of the vent 36 is substantially triangular with the pointed or apex portion of the triangle being adjacent the cavity 32. In this manner, the vent 36 provides an overflow for excess foam within the cavity, which upon curing, is connected to the molded article by a very thin section of foam which may be termed a flash and is easily removed from the molded portion.

In Fig. 3, a similar type of mold is shown wherein the central portion 24 is eliminated. In this case, the piston is designated at 38 and is guided on pins 40, 42 and 44. The main body portion 22 of the mold is the same and includes the cavity 32 and the vent 36 therearound.

In operation of the mold, three steps are necessary. These are shown in Figs. 4 through 6 inclusive, wherein in Fig. 4, a charge of foamed latex 50 of predetermined quantity is placed in the central portion of the mold while the piston 38 is removed. The piston 38 is then positioned on the pins 40, 42 and 44 and pressed downwardly whereupon the charge 50 is distributed outwardly toward the mold cavity 32. In Fig. 5, the piston 38 is part-way into the mold and the charge 50 has partially filled the cavity 32. In Fig. 6, the piston 38 has been bottomed upon the base plate 52 of the mold section 22 and the cavity is completely filled with foamed latex as shown at 54. The slight excess of latex foam used has been squeezed out through the vent 36 to form a flash 56. The mold with the foamed latex therein is next cured in any suitable manner such as in open steam after which the piston 38 is removed and the molded sponge rubber-like article may be pulled from the cavity and the flash 56 removed therefrom. In some instances, a very thin flash will cover the base plate 52. This is on the order of a thin film which may be easily removed from the molded article.

It will be found that articles molded in the instant mold are very uniform and are highly desirable in many instances where sponge rubber is desired. The mold disclosed in the drawings forms an article which is a gasket used in connection with a loud speaker and is merely used for illustrative purposes since it is apparent that the method disclosed herein may be used to form any number of different shaped articles having relatively complicated cross-sections whether the article is annular or not since the transfer may be accomplished satisfactorily in all cases where a vent is provided so that the foam is never placed under high pressure which will harm the character thereof.

It may be stated that the pressure of the transferring step does not impair the spongy character of the cured material as proved by the fact that the same foamed compound filled into a simple mold without any application of pressure has substantially the same density after curing as a part made in the transfer mold. It is not possible to break down the foam when transferring provided the relief vent is adequate to permit escape of excess foam as shown in the drawings.

It is preferable where molded articles having various diameters are to be made to have the smaller diameter closest to the vent as shown in the drawings. In this manner, the most difficult portions of the mold to fill are first filled whereby a complete fill is accomplished. This requirement is not necessarily limiting however, since the present article has also been made in the other direction. However, it has been found that results are more consistent if the most difficult portions of the mold are filled first so that the overflow of these portions eventually fill the easier-to-fill portions of the mold.

While the embodiments of the present invention as herein disclosed, constitute preferred forms, it is to be understood that other forms might be adopted.

What is claimed is as follows:

1. A transfer mold for use in the manufacture of annular spongy rubberlike articles from latex foam, comprising in combination; a main mold member including a cavity therein open at the top thereof and closed at the bottom, said cavity including stepped grooves in the confining vertical wall thereof, said grooves being of progressively less inner diameter from the bottom of the cavity to the top thereof, a transfer piston adapted to fit into said cavity and when in position to contact said bottom of the cavity while defining a vertical confining wall in cooperation with said grooves for producing an annular molding space therebetween, said piston being so dimensioned that a continuous annular pressure relief opening is formed between the wall of said piston and the upper wall of the uppermost groove, whereby foamed latex transferred into said annular molding space from the bottom of the cavity by said piston is maintained substantially uncompressed and wherein excessive foam may be exhausted completely around said piston.

2. A transfer mold for use in the manufacture of annular spongy rubberlike articles from latex foam, comprising in combination; a main mold member including a generally circular cavity therein open at the top and closed at the bottom thereof and being of progressively decreasing diameter from the bottom to the top thereof, a transfer piston of constant diameter and slightly less than the smallest diameter of said cavity, said piston being adapted to fit into said cavity while contacting said bottom of the mold and when in said position to define a vertical confining wall with said mold member wall for producing an annular molding space therebetween, the diameter of said piston with respect to the smallest diameter of said mold member wall being such as to provide a continuous open annular pressure relief opening therearound whereby latex foam transferred into said molding space by said piston is maintained at substantially atmospheric pressure therein and wherein excessive foam in said cavity may be relieved through said annular opening.

3. The transfer mold as claimed in claim 1 wherein said continuous annular pressure relief opening is angled away from said piston toward the upper surface of the upper wall of the mold so that said opening is of progressively greater diameter as it extends from said molding space.

References Cited in the file of this patent

UNITED STATES PATENTS

| Number | Name | Date |
|---|---|---|
| 296,097 | Woeber | Apr. 1, 1884 |
| 1,683,755 | Bigelow | Sept. 11, 1928 |
| 2,247,337 | Raflovich | June 24, 1941 |
| 2,251,858 | Snell | Aug. 5, 1941 |
| 2,256,769 | Amrine | Sept. 23, 1941 |
| 2,330,762 | Tooker | Sept. 28, 1943 |
| 2,351,329 | Gerstenmaier | June 13, 1944 |
| 2,394,122 | Urmston | Feb. 5, 1946 |
| 2,406,589 | Cunningham | Aug. 27, 1946 |
| 2,473,284 | Knaggs | June 14, 1949 |
| 2,510,841 | Stowe | June 6, 1950 |
| 2,574,915 | Fuller | Nov. 13, 1951 |